Oct. 23, 1956
W. R. HORST ET AL
2,767,975
WEIGHING DEVICE
Filed Oct. 22, 1953
2 Sheets-Sheet 1
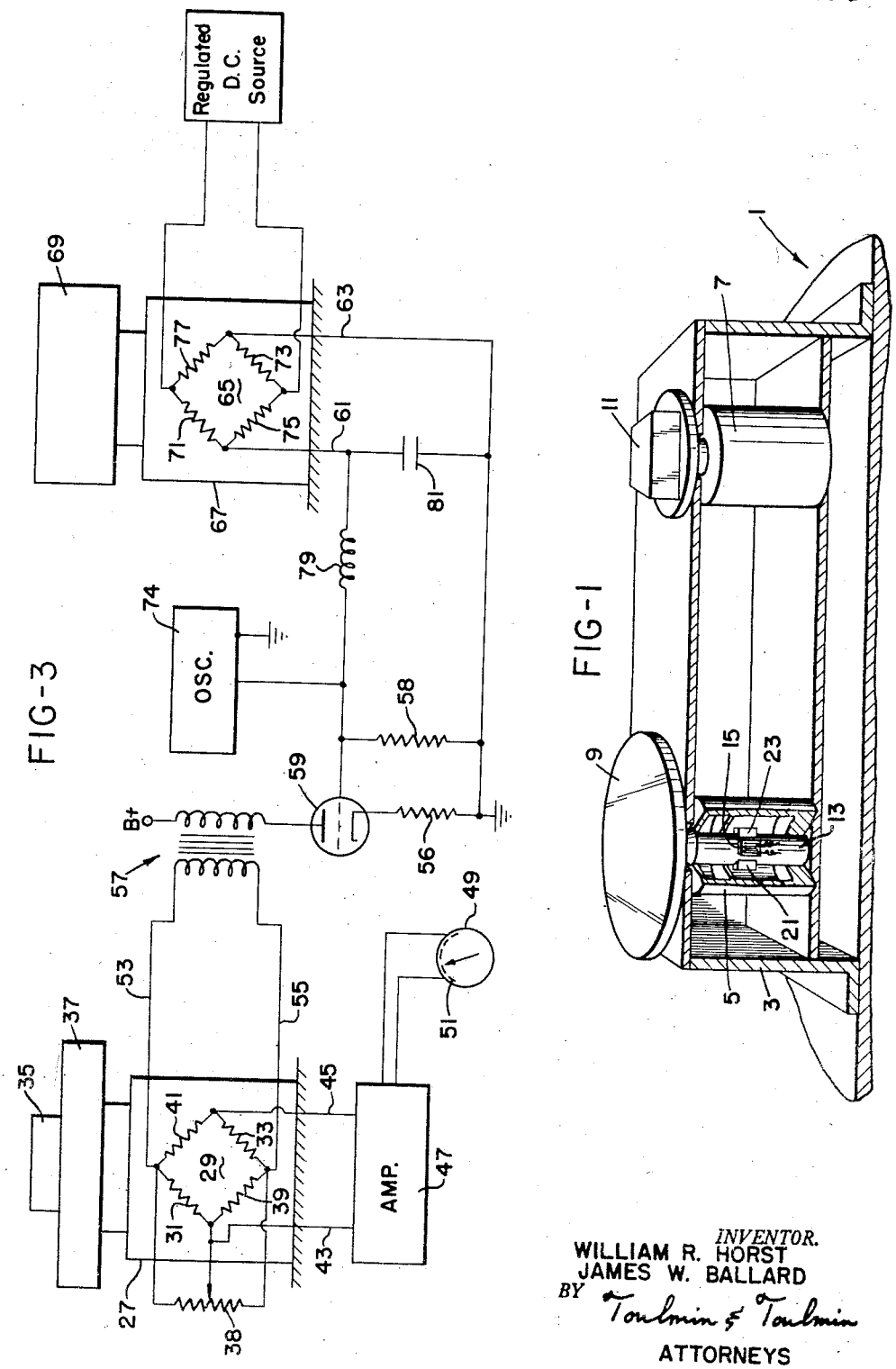
INVENTOR.
WILLIAM R. HORST
JAMES W. BALLARD
BY
Toulmin & Toulmin
ATTORNEYS Oct. 23, 1956
W. R. HORST ET AL
WEIGHING DEVICE
2,767,975
Filed Oct. 22, 1953
2 Sheets-Sheet 2
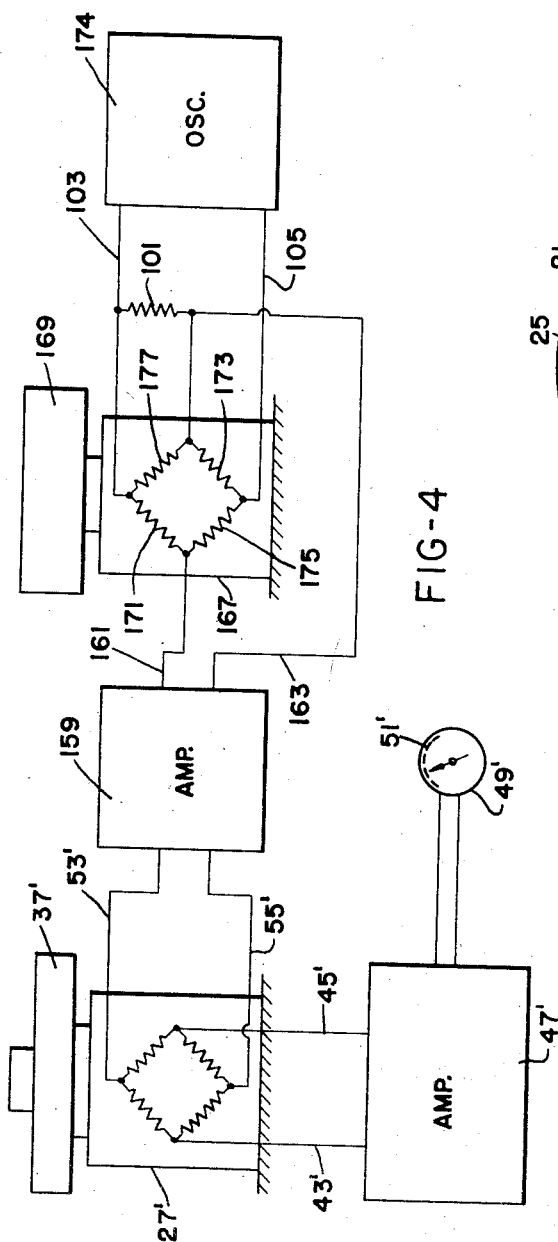
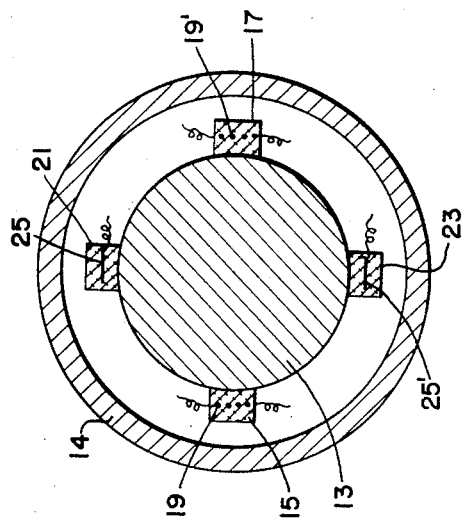
INVENTOR.
WILLIAM R. HORST
JAMES W. BALLARD
BY Toulmin & Toulmin
ATTORNEYS

United States Patent Office 2,767,975
Patented Oct. 23, 1956

2,767,975

WEIGHING DEVICE

William R. Horst and James W. Ballard, Dayton, Ohio, assignors to The Commonwealth Engineering Company of Ohio, Dayton, Ohio, a corporation of Ohio Application October 22, 1953, Serial No. 387,728

5 Claims. (Cl. 265—70)

This invention relates to a weighing device and more particularly to a device which is useful under conditions where forces other than that of gravity during the weighing action are exerted upon the body to be weighed.

The invention contemplates the provision of a weighing device which would be extremely useful even under the most adverse conditions for effecting weighing. For example, at sea it is frequently desirable to accurately weigh personnel or material and on the smaller craft particularly the effect of transient forces due to yawing, pitch and roll of the ship are such that it is difficult to secure correct weights as the acceleration occasioned by the transient forces interferes with the acceleration occasioned by the purely gravitational force present.

More specifically when a ship, for example, is urged upwardly by the pressure of the sea a weighing device secured to a deck is also urged upwardly—and an object on the device is likewise given an upward acceleration. Consequently the pressure of the object on the weighing device increases over that occasioned by gravitational force alone and the scale reading of the device is in error by an amount which is dependent on the upward accelerating force. Similarly if the ship falls quickly the apparent weight produced by the object is less than the true weight due to the negative acceleration.

While the structures of invention and the method of practicing the invention are applicable to other apparatus which is subject to forces of both negative and positive acceleration, the invention will be described with reference to a ship wherein it has its greatest utility.

It is therefore a principal object of this invention to describe a weighing device which provides for overcoming the effects of the acceleration and deceleration forces occasioned by ship movement.

The invention further contemplates the provision of a novel weighing method wherein the cancellation of effects due to the presence of uncontrolled forces is achieved.

It is a particular object of this invention to describe a weighing device which is essentially electrical in nature, is compact, of a high degree of accuracy and has relative freedom from operational difficulties.

These and other allied objects of the invention are attained by providing a load cell, which is adapted for weighing, with an input voltage which varies in accordance with transitory or transient forces which would give rise to error in weight measurements if their effects were not eliminated.

The load cell itself is preferably a standard unit such as those produced commercially and wherein strain gauges form a part of a bridge circuit, the gauges themselves being bonded to a sensing element in such manner that they undergo resistance changes precisely proportional to the strain applied to the sensing element. These strain gauges are very small wires which carry an electric current occasioned by an input voltage and as the resistance changes with applied loads the output voltages of the load cell change in a manner proportional to the loads, and accordingly the load is readily measurable on an indicator or recorder of the potentiometer type, or of the sensitive micro-ammeter type.

The cell as described in the above paragraph is useful for weighing under conditions where only the force of gravity is applied to the weight and cell—if the weighing device is mounted on a ship the object to be weighed is subject to accelerations other than gravity and a weight taken under such conditions would of course be in error. A feature of this invention is the provision of an input voltage which varies in accordance with forces which are not gravitational in nature—and this voltage is so applied to the weighing load cell as to cancel out the effects of those forces on the weight to be measured and on the cell itself.

The development of the variable voltage for the input to the weighing cell is achieved by providing a second load cell which is permanently loaded with a standard mass which may be of any convenient size. This mass and cell are secured with the weighing cell on a deck of the ship in close proximity—thus the cells, the object to be weighed and the standard mass will all be subject to the same positive acceleration and negative acceleration—i. e. deceleration arising from ship movement—therefore the extent to which the standard load cell is affected by the transient or transitory accelerating forces is in direct proportion to the change occasioned in the weighing load cell. Thus the voltage change developed by the standard load cell may be utilized as the source of the variable voltage input to the weighing load cell to offset the effect of the transient forces acting on the weighing cell.

The load cell units are each adapted to respond only to forces which are applied in a given general direction; thus in the structure of invention vertical forces and vertical components affect the strain gauges while horizontal forces or those which are applied horizontally do not affect the cells.

The structure of invention is thus adapted to yield accurate weights even when the ship rolls and the weight is applied to the weighing cell at a slight angle—for the standard may well affect its strain gauge arrangement in a manner such as to offset the effect of the roll on the standard weight—the offsetting being accomplished by a change in the input voltage to the weighing load cell.

In the inventive embodiments to be described the operation is such that the corrective action is upon a percentage basis and not an additive one, and that once a correction is made for accelerations and angular loading for a given weight on the platform (as for the platform itself, for example) the correction will be automatically accurate for any other weight.

The invention will be more fully understood by reference to the following detailed description and accompanying drawings wherein:

Figure 1 is a perspective view partially in section which illustrates the structure of invention mounted on a portion of a deck;

Figure 2 is a sectional view of a load cell and illustrates an arrangement of the strain gauges on the sensing element of the cell;

Figure 3 is a schematic arrangement of a circuit embodying the invention; and

Figure 4 illustrates a further embodiment of the invention.

Referring to the drawings there is indicated generally at 1 the deck of a ship on which is secured in a suitable manner casing 3; casing 3 includes the components which incorporate the structure of invention including a pair of load cells 5, 7 (Figure 1).

Load cell 5 is provided with a small platform 9 adapted to receive a weight such as the body of a man, a box of material, etc.; the cell may of course be selected of any convenient size suitable for an intended purpose and such are commercially available in capacities of up to 50,000 pounds although for the present discussion a cell having a capacity range of 0–500 is considered as suitable and the platform accordingly need only be large enough to accommodate a human.

Load cell 7 is provided with a mass 11 which may suitably be of about 20 pounds weight and for compactness may be of lead.

The cells 5, 7 upon which the forces act comprise essentially (Figure 2) a solid steel cylinder 13 which is the sensing element; this element is surrounded by a heavy protective shell 14. The element is customarily chosen to deflect about .006" under full or capacity loading and is responsive to compressive as well as tensive stresses.

Extending vertically along the cylinder 13 and in opposed diametrical relation are a pair of strain gauges 15, 17 which are bonded to the cylinder and extend and contract therewith. The extension and contraction of the fine wires 19, 19' of the strain gauge cause increase and decrease respectively of the electrical resistance; in this connection it is important to note that if the resistance of the wire were, for example, to be halved by doubling the load the current flow therethrough would be doubled; further if the voltage input were doubled at a constant resistance the current flow would be doubled; thus the relationship which exists is that the product of the voltage input and applied load on the cell determine the output voltage of the cell which voltage is directly proportional to that product.

The cells described are themselves commercially available and include the bridges which are unbalanced by the application of even slight stresses thereto.

As shown in Figure 2 the load cell 13 includes a pair of temperature compensating strain gauges 21, 23 and the fine wires thereof indicated at 25, 25' are unaffected by axial stresses on the cylinder but are arranged around the periphery and are utilized to occasion cancellation of effects due to thermal changes. Such arrangement is known and included in the commercial cells and is presented here for sake of clarity only.

Referring now to Figure 3 and a schematic circuit arrangement a weighing load cell is indicated at 27 and includes a bridge circuit 29 the resistors 31, 33 of which represent the active wires which are subject to resistance change upon change in weight 35 on the platform 37. The resistors 39, 41 are the temperature compensating resistors.

The output of bridge 29 developed across leads 43, 45 is fed to a suitable amplifier 47 which raises the voltage to an extent sufficient to motivate the indicator 49 which preferably carries a scale 51 graduated in weight units, as for example pounds.

The input to the bridge is applied across leads 53, 55 which are connected to the secondary of transformer 57; the primary of this transformer is in the plate circuit of triode 59 the amplification of which is dependent on the bias voltage applied between the grid and cathode of the tube. An increase in bias voltage decreases the tube output and accordingly the voltage across leads 53, 55 varies inversely with the bias voltage.

In the present example the bias voltage for tube 59 is developed across the output leads 61, 63 of bridge 65 in the standard cell 67 which is provided with a standard weight indicated at 69 and which weight is subject to the same transitory forces and has the same acceleration as the object 35 to be weighed on platform 37. The bridge 65 is normally balanced and standard weight 69 itself causes a slight unbalance thus providing a voltage across leads 53, 55 when the only accelerating force is that of gravity, thus permitting ordinary weighing procedures.

The resistors of bridge 65 are constituted by strain gauges as referred to hereinbefore and resistances 71, 73 constitute the active elements which correspond to resistances 31, 33; resistances 75, 77 similarly to resistances 39, 41 are temperature compensating resistors.

This bridge 65 is fed by a regulated direct current source of about 6 volts and the standard weight 69 causes a degree of unbalance in the bridge resulting in an output voltage across leads 61, 63 which is proportional to the axial load on the cell; this voltage is applied to tube 59 and provides a bias for the same.

A signal voltage supplied by oscillator 74 preferably of about 1000 cycles per second is also supplied to the grid of tube 59; the signal is kept from bridge 65 by a suitable filter consisting of inductance 79 and capacitance 81. Tube 59 is provided with a fixed bias by resistor 56 and resistor 58 is a grid leak to prevent charge build up in the tube grid.

The indicator 49 is initially "zero set" by adjustment of the arm of potentiometer 38 which is in parallel with the bridge 29; this setting is effected with a suitable constant voltage fed to the bridge 65 with the weight 69 positioned and a suitable voltage being fed thereby to leads 53, 55.

In the operation of the device if it be assumed that the ship has been given an upward acceleration, as by the force of the waves, both the standard weight and the object to be weighed, as well as the cells themselves, will be given the same acceleration by this transient effect. Accordingly the active resistance wires of both bridges will be contracted since the forces applied to the sensing elements will have compressed these; normally as to the weighing cell this would have resulted in an increased voltage output due to the lowered resistance and the weight would be in error. However in the case of the invention the decrease of resistance in bridge 65 has resulted in an increased voltage output from that bridge which thereby increased the bias on tube 59 decreasing the signal current flow to transformer 57 and accordingly decreasing the voltage across input wires 53, 55 of bridge 29. This drop in the potential across bridge 29 itself tends to cause a decrease in bridge current flow which offsets the tendency to increased current flow in the bridge 29 caused by the upward accelerating force.

Similarly it will be noted that if the ship should drop suddenly both the standard weight and the object would be accelerated in a downward direction due both to gravity and to the transient forces, and the effect of the transient forces on the standard would be the same as that on the object to be weighed. Accordingly there would be less compressive strain on the load cell 67; the active wires 71, 73 of the cell would demonstrate a greater resistance and the output voltage developed across leads 61, 63 would be decreased, thus permitting a greater current flow through tube 59 to transformer 57 and the voltage developed across the input leads to weighing cell 27 would be increased. Therefore the output of the cell across leads 43, 45 would be increased and the indicator 49 would record on the scale 51 the proper weight since the change of input has compensated for the effect of the acceleration due to the transient forces.

In practice regulation of the voltage level across the input 53, 55 may be provided initially by controlling the voltage level supplied by the direct current source; this setting is preferably made in the static condition and will be dependent upon the precise nature of amplifier 59 and transformer 57.

In the embodiment shown in Figure 4 the same numerals have been retained but primed for the weighing portion of the device; thus the indicator scale 51' is carried on the indicator 49' which is supplied through the voltage amplifier 47' which amplifies the voltage developed across the leads 43', 45' and serves to indicate on the indicator scale the weight on the platform 37'.

This weight and the transient effect associated with the ship's movement occasion the actuation of bridge 27' upon the presentation of an input across leads 53', 55' to the bridge. However, this arrangement differs from that of Figure 3 primarily in that a resistor 101 is inserted across a primary arm 177 of the bridge 167, which causes a slight unbalance of the bridge in the normal condition thereof, that is without the standard weight 169 and without any transient forces exerted on the structure.

The bridge 167 is composed of the active strain gauges 171, 173 and the temperature compensating resistors 175, 177 across the latter of which the resistance 101 is placed. The bridge is fed by a 1000 cycle per second oscillator 174 across input leads 103, 105 and the output is developed across leads 161, 163 and is fed to an amplifier 159 which provides the input to the bridge 27'.

In this arrangement the bridge itself is initially unbalanced as noted due to resistor 101 which should be selected to be large with respect to resistor 177. As the standard weight 169 is applied thereto the bridge is brought towards a balanced condition, and accordingly the output voltage from the cell across the leads 161, 163 decreases with increasing load, which it is to be noted is directly the opposite to that with respect to the embodiment of Figure 3. Similarly negative accelerations increase the degree of unbalance of bridge 167. Accordingly in the embodiment of Figure 4 the effect of transitory forces on the two cells is to produce opposite results which may be made to cancel each other.

In the operation of the device of Figure 4 an accelerating force applied to the assembly, for example an upward force, tends to result in a decreased output across leads 161, 163 since bridge 167 approaches a balanced condition with increased force on the sensing element thereof.

Under the influence of the same transitory forces which are affecting the standard weight 169 the output across leads 43', 45' would be increased were it not for the fact that the input is decreased in just the right proportion to compensate for the effect of the transitory forces; the decrease of input of course results from the decreased input to amplifier 159 across the leads 161, 163.

The voltage supplied to bridge 167 is controlled by controlling the voltage output of oscillator (1000 C. P. S. preferably) 174.

It will be understood that this invention is susceptible to modification in order to adopt it to different usages and conditions and accordingly, it is desired to comprehend such modifications within this invention as may fall within the scope of the appended claims.

We claim:

1. In combination in a weighing device wherein the device is subject to accelerations other than that due to gravity, a pair of load cells each having a bridge circuit and each having electrical resistance elements the resistances of which vary with the degree of stress applied thereto, means to derive an output voltage from each of said bridge circuits in an unbalanced condition thereof, means to provide an unbalanced condition in a first one of the bridges in a static condition of the load cell thereof, means to vary the voltage input of the second one of said bridges inversely with changes in the output of the first one of said bridges, means to amplify the output of the first bridge, and means to supply the amplified output of the first of said bridges to the second of said bridges.

2. In combination, in a weighing device wherein the device is subject to accelerations other than that due to gravity, a pair of load cells each having a bridge circuit and each having electrical resistance elements the resistances of which vary with the degree of stress applied thereto, means to derive an output voltage from each of said bridge circuits in an unbalanced condition thereof, signal means controllable by the output of a first one of the bridges to supply a signal to the second of the bridges, and means to vary the voltage input of the second of said bridges inversely with change in the output of the first of said bridges.

3. In a weighing device, a first load cell having a sensing element and a weighing platform supported by the element, said cell comprising a first bridge circuit having input and output terminals, a second load cell having a standard weight thereon and comprising a second bridge circuit having input and output terminals, circuit means connecting the output terminals of the second bridge circuit and the input terminals of the first bridge circuit, a source of voltage connected to the input terminals of the second bridge circuit, an amplifier in the output of the first bridge circuit, and indicating means connected to the amplifier, the said circuit means including a transformer and a vacuum tube having a cathode, anode and control grid, the primary of the transformer being in the anode circuit of the tube and the secondary of the transformer being across the input terminals of said first bridge circuit, the output terminals of the second bridge circuit being connected between the cathode and grid of the vacuum tube, said circuit means also including an A. C. source of voltage between said cathode and grid.

4. In combination, in a weighing device wherein the device is subject to accelerations other than that due to gravity, a pair of load cells each having a bridge circuit and each having electrical resistance elements the resistances of which vary with the degree of stress applied thereto, said bridges each having input terminals, means including output terminals of the bridges to derive an output voltage from each of said bridge circuits in an unbalanced condition thereof, signal means controlled by a first one of said bridge circuits operable to apply a signal to the input of the second one of said bridge circuits in response to an output voltage of the first one of said bridge circuits, and means to vary the output voltage of the first of said bridge circuits inversely with the loading of the first bridge circuit.

5. In combination, in a weighing device wherein the device is subject to accelerations other than that due to gravity, a pair of load cells each having a bridge circuit and each having electrical resistance elements the resistances of which vary with the degree of stress applied thereto, said bridges each having input terminals, means including output terminals of the bridges to derive an output voltage from each of said bridge circuits in an unbalanced condition thereof, signal means controlled by a first one of said bridge circuits to apply a signal to the input of the second one of said bridge circuits in response to an output voltage of the first one of said bridge circuits, and means to vary the input of the second of said bridges inversely with the loading of the first bridge circuit.

References Cited in the file of this patent

UNITED STATES PATENTS

| 2,592,009 | Clement | Apr. 8, 1952 |
| 2,610,052 | Macgeorge | Sept. 9, 1952 |
| 2,623,636 | Pounds | Dec. 30, 1952 |

FOREIGN PATENTS

| 721,365 | Germany | June 5, 1942 |
| 921,978 | France | May 23, 1947 |